(12) United States Patent
Huh et al.

(10) Patent No.: US 12,547,024 B2
(45) Date of Patent: Feb. 10, 2026

(54) LIQUID CRYSTAL PANEL AND MANUFACTURING METHOD THEREOF

(71) Applicant: CORNING INCORPORATED, Corning, NY (US)

(72) Inventors: Jae-won Huh, Asan (KR); Sangtae Kim, Cheonan-si (KR); Sukjoon Kim, Anyang-si (KR); Jin-Wook Song, Seongnam (KR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 18/619,389

(22) Filed: Mar. 28, 2024

(65) Prior Publication Data

US 2024/0329447 A1    Oct. 3, 2024

(30) Foreign Application Priority Data

Mar. 30, 2023  (KR) .................. 10-2023-0042360

(51) Int. Cl.
| | | |
|---|---|---|
| *G02F 1/1333* | (2006.01) | |
| *G02F 1/133* | (2006.01) | |
| *G02F 1/1335* | (2006.01) | |
| *G02F 1/1339* | (2006.01) | |
| *G02F 1/137* | (2006.01) | |

(52) U.S. Cl.
CPC .... *G02F 1/133302* (2021.01); *G02F 1/13324* (2021.01); *G02F 1/133502* (2013.01); *G02F 1/13394* (2013.01); *G02F 1/137* (2013.01)

(58) Field of Classification Search
CPC .......... G02F 1/133302; G02F 1/13324; G02F 1/133502; G02F 1/13394; G02F 1/137
See application file for complete search history.

(56) References Cited

U.S. PATENT DOCUMENTS

| | | | |
|---|---|---|---|
| 4,958,917 A | * | 9/1990 | Hashimoto ............. G02F 1/153 359/275 |
| 7,940,457 B2 | | 5/2011 | Jain et al. |
| 10,473,997 B2 | | 11/2019 | Higashihara et al. |
| 11,520,205 B2 | | 12/2022 | Bergh et al. |

(Continued)

FOREIGN PATENT DOCUMENTS

| | | |
|---|---|---|
| EP | 3332288 B1 | 10/2020 |
| EP | 3704339 B1 | 9/2021 |

(Continued)

OTHER PUBLICATIONS

"Halio-Glazing Datasheets", 2024, 7 pages.

(Continued)

*Primary Examiner* — James A Dudek

(57) ABSTRACT

A liquid crystal panel includes a first glass plate and a second glass plate facing each other, a liquid crystal cell arranged between the first glass plate and the second glass plate, a first spacer arranged between the first glass plate and the liquid crystal cell, and configured to space the liquid crystal cell from the first glass plate, and a second spacer arranged between the second glass plate and the liquid crystal cell, and configured to space the liquid crystal cell from the second glass plate, wherein the liquid crystal cell includes a first sheet, a second sheet spaced apart from the first sheet, and a liquid crystal layer arranged between the first sheet and the second sheet.

23 Claims, 15 Drawing Sheets

(56) References Cited

U.S. PATENT DOCUMENTS

| | | | |
|---|---|---|---|
| 2002/0075552 A1* | 6/2002 | Poll | G02F 1/161 |
| | | | 359/275 |
| 2010/0045924 A1* | 2/2010 | Powers | G02B 5/23 |
| | | | 349/190 |
| 2014/0290156 A1 | 10/2014 | Bruce et al. | |
| 2015/0349028 A1* | 12/2015 | Lee | G02F 1/133502 |
| | | | 349/86 |
| 2015/0378189 A1* | 12/2015 | Kim | H10K 50/854 |
| | | | 349/86 |
| 2020/0081310 A1 | 3/2020 | Higashihara et al. | |
| 2023/0053939 A1 | 2/2023 | Choi et al. | |

FOREIGN PATENT DOCUMENTS

| | | |
|---|---|---|
| WO | 2019/086340 A1 | 5/2019 |
| WO | 2022/271514 A1 | 12/2022 |
| WO | 2024/101816 A1 | 5/2024 |

OTHER PUBLICATIONS

"LG Hausys launches Superlight triple-layer glass . . . Weight Insulation performance", 2020, 2 pages.

"Suspended Particle Devices—How Smart Windows Work" | HowStuffWorks, 2024, 3 pages.

Huh et al., "Technologies for display application of liquid crystal light shutters", Molecular Crystals and Liquid Crystals, 644(1), pp. 120-129.

* cited by examiner

LIQUID CRYSTAL PANEL AND MANUFACTURING METHOD THEREOF

CROSS-REFERENCE TO RELATED APPLICATION

This application is based on and claims priority under 35 U.S.C. § 119 to Korean Patent Application No. 10-2023-0042360, filed on Mar. 30, 2023, in the Korean Intellectual Property Office, the disclosure of which is incorporated by reference herein in its entirety.

BACKGROUND

1. Field

The disclosure relates to a liquid crystal panel and a manufacturing method thereof.

2. Description of the Related Art

A laminated glass unit including a plurality of glass plates may be effective in insulation, soundproofing, and/or condensation prevention. Laminated glass units as described above may be used for buildings, transportation such as cars, trains, and airplanes, or windows of electronic apparatuses such as refrigerators and freezers. In general, as the number of glass plates constituting a laminated glass unit increases, the performance of insulation, soundproofing, and/or condensation prevention may be improved, but the weight of the laminated glass unit may increase.

SUMMARY

Provided are a liquid crystal panel having light weight and improved durability, and a manufacturing method thereof.

However, the problems to be solved by the spirit of the disclosure are not limited to the problems described above, and may be variously extended without departing from the spirit and scope of the disclosure.

Additional aspects will be set forth in part in the description which follows and, in part, will be apparent from the description, or may be learned by practice of the presented embodiments of the disclosure.

According to an aspect of the disclosure, a liquid crystal panel includes a first glass plate and a second glass plate facing each other, a liquid crystal cell arranged between the first glass plate and the second glass plate, a first spacer arranged between the first glass plate and the liquid crystal cell, and configured to space the liquid crystal cell from the first glass plate, and a second spacer arranged between the second glass plate and the liquid crystal cell, and configured to space the liquid crystal cell from the second glass plate, wherein the liquid crystal cell includes a first sheet, a second sheet spaced apart from the first sheet, and a liquid crystal layer arranged between the first sheet and the second sheet.

The liquid crystal panel may further include an external driving device located outside the liquid crystal cell, wherein the liquid crystal cell is configured to be supplied with electrical energy from the external driving device.

The liquid crystal cell may be configured to switch among a transparent mode, a haze mode, and a black mode, according to an amount of electrical energy supplied from the external driving device.

The liquid crystal layer may be controllable to adjust a visible light transmittance of the liquid crystal panel.

The first sheet may contact the first spacer, and the second sheet may contact the second spacer.

Each of a thickness of the first glass plate and a thickness of the second glass plate may be greater than a greater of a thickness of the first sheet and a thickness of the second sheet.

The liquid crystal cell may include a solar cell substrate.

Each of the first glass plate and the second glass plate may include soda lime glass.

The liquid crystal panel may further include low-e coating layers respectively disposed on one surface of the first glass plate facing the second glass plate and one surface of the second glass plate facing the first glass plate.

Each of the first glass plate and the second glass plate may have a thickness greater than or equal to 3 mm and less than or equal to 10 mm.

According to another aspect of the disclosure, a liquid crystal panel includes a liquid crystal cell including a first sheet, a second sheet spaced apart from the first sheet in a first direction, and a first liquid crystal layer and a second liquid crystal layer stacked in the first direction between the first sheet and the second sheet, a first glass plate and a second glass plate arranged to be spaced apart from each other in the first direction with the liquid crystal cell therebetween, a first spacer arranged between the first glass plate and the liquid crystal cell, and configured to space the liquid crystal cell from the first glass plate, and a second spacer arranged between the second glass plate and the liquid crystal cell, and configured to space the liquid crystal cell from the second glass plate.

A surface of the first spacer parallel to the first direction may be coplanar with a surface of the first glass plate parallel to the first direction.

A surface of the first spacer parallel to the first direction may be located at a different vertical level from a surface of the first glass plate parallel to the first direction.

Each of a circumference of the first spacer and a circumference of the second spacer may be offset from a circumference of the first glass plate or a circumference of the second glass plate by a first distance.

A circumference of the liquid crystal cell may be offset from a circumference of the first glass plate or a circumference of the second glass plate by a second distance.

The second liquid crystal layer may be controllable to adjust a visible light transmittance of the liquid crystal panel.

A widest surface of the first liquid crystal layer may be in contact with a widest surface of the first sheet, and a widest surface of the second liquid crystal layer may be in contact with a widest surface of the second sheet.

The first liquid crystal layer may include a solar cell substrate.

According to another aspect of the disclosure, a liquid crystal panel includes a first glass plate and a second glass plate facing each other, a liquid crystal cell arranged between the first glass plate and the second glass plate, a first spacer arranged between the first glass plate and the liquid crystal cell, and configured to space the liquid crystal cell from the first glass plate, a second spacer arranged between the second glass plate and the liquid crystal cell, and configured to space the liquid crystal cell from the second glass plate, and low-e coating layers respectively disposed on one surface of the first glass plate facing the second glass plate and one surface of the second glass plate facing the first glass plate, wherein the liquid crystal cell includes a first sheet contacting the first spacer, a second sheet spaced apart from the first sheet and contacting the second spacer, and a first liquid crystal layer arranged between the first sheet and the second sheet, one surface of the first liquid crystal layer is in contact with a widest surface of the first sheet, and the other surface of the liquid crystal layer facing the one surface is in contact with a widest surface of the second sheet.

The liquid crystal panel may further include a second liquid crystal layer arranged between the first glass plate and the second glass plate, wherein the first liquid crystal layer is controllable to adjust a visible light transmittance of the liquid crystal panel, and the second liquid crystal layer includes a solar cell substrate.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
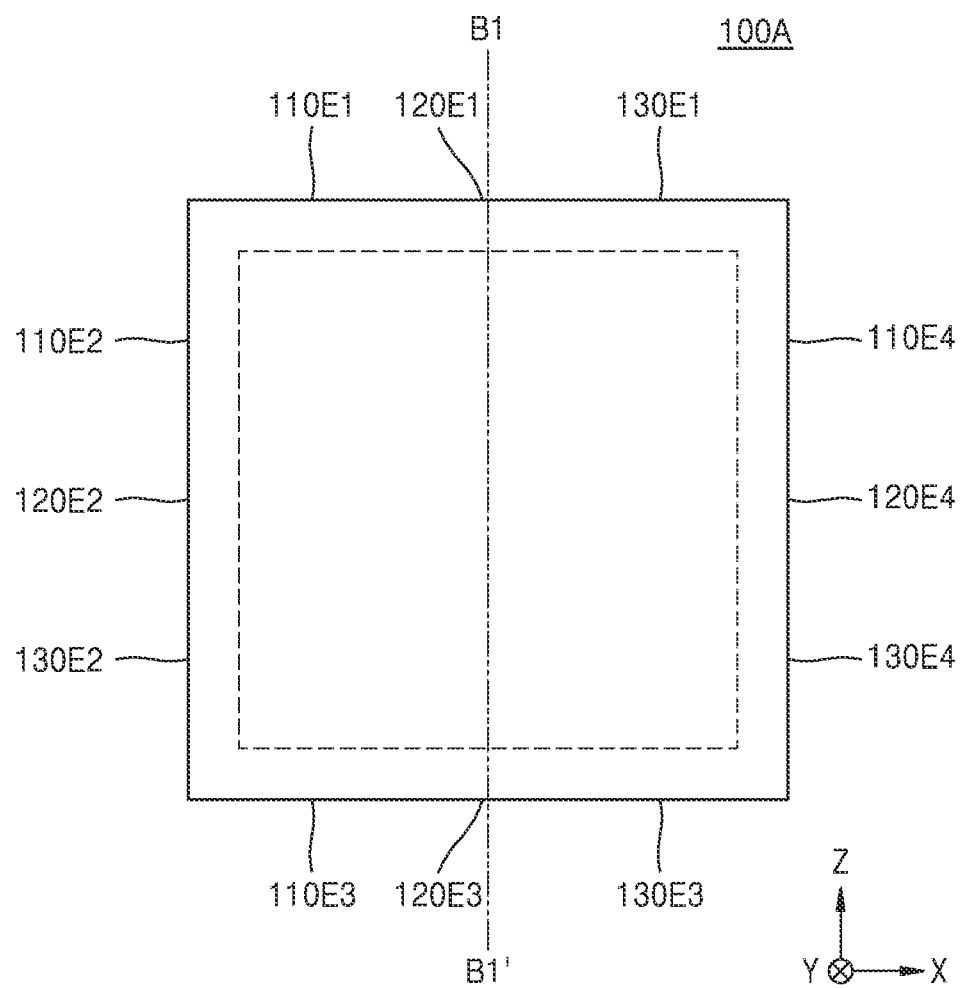
FIG. 1 is a plan view of a liquid crystal panel according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The embodiments may, however, be modified in various different forms and should not be construed as being limited to the embodiments set forth herein. The embodiments are provided so that the disclosure will be thorough and complete, and will fully convey the concept of the disclosure to those skilled in the art. Like reference numerals in the drawings denote like elements. In addition, various elements and regions in the drawing are schematically drawn. Accordingly, the concept of the disclosure is not limited by the relative size or spacing drawn in the accompanying drawings.

Although the terms first, second, etc. may be used herein to describe various elements or components, these elements or components should not be limited by these terms. These terms are only used to distinguish one element or component from another element or component. For example, a first element or component may be termed a second element or component without departing from the scope of the disclosure, and conversely, a second element or component may be termed a first element or component.

The terminology used herein is for the purpose of describing particular embodiments only and is not intended to be limiting of the concept of the disclosure. As used herein, the singular forms are intended to include the plural forms as well, unless the context clearly indicates otherwise. It will be further understood that the terms "comprises", "comprising", "have", and/or "having" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the concept of the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

When some embodiments are implemented differently, a particular process order may be performed differently from the order described. For example, two processes described in succession may be performed substantially simultaneously, or may be performed in an order reverse to the order described.

In the accompanying drawings, variations of the illustrated shapes may be expected, for example, according to manufacturing techniques and/or tolerances. Therefore, the embodiments should not be construed as being limited to a particular shape of the region illustrated herein, but should include, for example, a change in shape resulting from a manufacturing process. As used herein, the term "and/or," includes any and all combinations of one or more of the associated listed items.

Figure 2A:
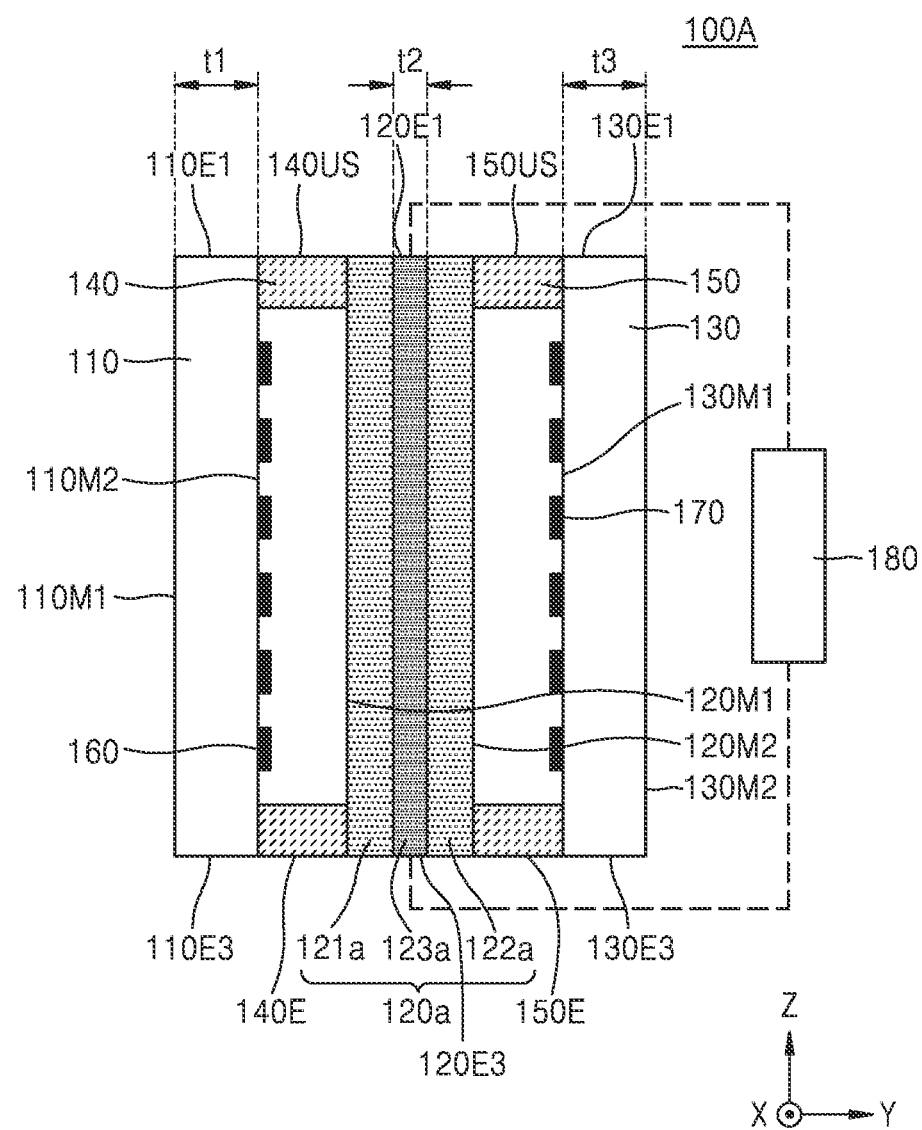
FIG. 2A is a cross-sectional view taken along line B1-B1' of FIG. 1.

FIG. 1 is a plan view of a liquid crystal panel according to an embodiment, and FIG. 2A is a cross-sectional view taken along line B1-B1' of FIG. 1.

Referring to FIGS. 1 and 2A, a liquid crystal panel 100A may include a plurality of glass plates 110 and 130, and a liquid crystal cell 120a arranged between the plurality of glass plates 110 and 130. For example, the liquid crystal panel 100A may include the first glass plate 110 and the second glass plate 130. Each of the first glass plate 110 and the second glass plate 130 may be referred to as an outer glass plate.

The first glass plate 110 may include two main surfaces (e.g., a first main surface 110M1 and a second main surface 110M2) facing each other, and a circumference surrounding the first main surface 110M1 and the second main surface 110M2. The circumference of the first glass plate 110 may include at least one edge surface (e.g., a first edge surface 110E1, a second edge surface 110E2, a third edge surface 110E3, and/or a fourth edge surface 110E4) between the first main surface 110M1 and the second main surface 110M2. For example, each of the first main surface 110M1 and the second main surface 110M2 of the first glass plate 110 may have a rectangular shape, and the circumference of the first glass plate 110 may include the first to fourth edge surfaces 110E1 to 110E4. In an embodiment, each of the first main surface 110M1 and the second main surface 110M2 of the first glass plate 110 may have a shape different from the rectangular shape, and the number of edge surfaces constituting the circumference of the first glass plate 110 may be greater or less than 4. In some embodiments, the first main surface 110M1 and the second main surface 110M2 of the first glass plate 110 may be substantially parallel to each other. In an embodiment, the first main surface 110M1 and the second main surface 110M2 of the first glass plate 110 may not be substantially parallel to each other.

Similarly, the second glass plate 130 may include two main surfaces (e.g., a first main surface 130M1 and a second main surface 130M2) facing each other, and a circumference surrounding the first main surface 130M1 and the second main surface 130M2. The circumference of the second glass plate 130 may include at least one edge surface (e.g., a first edge surface 130E1, a second edge surface 130E2, a third edge surface 130E3, and/or a fourth edge surface 130E4) between the first main surface 130M1 and the second main surface 130M2. For example, each of the first main surface 130M1 and the second main surface 130M2 of the second glass plate 130 may have a rectangular shape, and the circumference of the second glass plate 130 may include the first to fourth edge surfaces 130E1 to 130E4. In an embodiment, each of the first main surface 130M1 and the second main surface 130M2 of the second glass plate 130 may have a shape different from the rectangular shape, and the number of edge surfaces constituting the circumference of the second glass plate 130 may be greater or less than 4. In some embodiments, the first main surface 130M1 and the second main surface 130M2 of the second glass plate 130 may be substantially parallel to each other. In an embodiment, the first main surface 130M1 and the second main surface 130M2 of the second glass plate 130 may not be substantially parallel to each other.

The liquid crystal cell 120a may include two main surfaces (e.g., a first main surface 120M1 and a second main surface 120M2) facing each other, and a circumference surrounding the first main surface 120M1 and the second main surface 120M2. The circumference of the liquid crystal cell 120a may include at least one edge surface (e.g., a first edge surface 120E1, a second edge surface 120E2, a third edge surface 120E3, and/or a fourth edge surface 120E4) between the first main surface 120M1 and the second main surface 120M2. For example, each of the first main surface 120M1 and the second main surface 120M2 of the liquid crystal cell 120a may have a rectangular shape, and the circumference of the liquid crystal cell 120a may include the first to fourth edge surfaces 120E1 to 120E4. In an embodiment, each of the first main surface 120M1 and the second main surface 120M2 of the liquid crystal cell 120a may have a shape different from the rectangular shape, and the number of edge surfaces constituting the circumference of the liquid crystal cell 120a may be greater or less than 4. In some embodiments, the first main surface 120M1 and the second main surface 120M2 of the liquid crystal cell 120a may be substantially parallel to each other. In an embodiment, the first main surface 120M1 and the second main surface 120M2 of the liquid crystal cell 120a may not be substantially parallel to each other.

The first main surface 120M1 of the liquid crystal cell 120a may face the second main surface 110M2 of the first glass plate 110, and the second main surface 120M2 of the liquid crystal cell 120a may face the first main surface 130M1 of the second glass plate 130. In some embodiments, the first main surface 120M1 of the liquid crystal cell 120a may be substantially parallel to the second main surface 110M2 of the first glass plate 110, and the second main surface 120M2 of the liquid crystal cell 120a may be substantially parallel to the first main surface 130M1 of the second glass plate 130. In an embodiment, the first main surface 120M1 of the liquid crystal cell 120a may not be substantially parallel to the second main surface 110M2 of the first glass plate 110, and the second main surface 120M2 of the liquid crystal cell 120a may not be substantially parallel to the first main surface 130M1 of the second glass plate 130.

According to an embodiment, the liquid crystal cell 120a may include a first sheet 121a, a second sheet 122a spaced apart from the first sheet 121a, and a liquid crystal layer 123a arranged between the first sheet 121a and the second sheet 122a. As illustrated in FIGS. 1 and 2A, widest surfaces of the first glass plate 110, the second glass plate 130, and the liquid crystal cell 120a may be parallel to one another in a first direction (an X direction) and a third direction (a Z direction). The widest surfaces may refer to the first main surface 110M1 and the second main surface 110M2 of the first glass plate 110, the first main surface 120M1 and the second main surface 120M2 of the liquid crystal cell 120a, and the first main surface 130M1 and the second main surface 130M2 of the second glass plate 130, respectively. In addition, a direction in which the first sheet 121a, the liquid crystal layer 123a, and the second sheet 122a are stacked may be defined as a second direction (a Y direction) that is perpendicular to the first direction (the X direction).

In some embodiments, a thickness t1 of the first glass plate 110 between the first main surface 110M1 and the second main surface 110M2 of the first glass plate 110 and a thickness t3 of the second glass plate 130 between the first main surface 130M1 and the second main surface 130M2 of the second glass plate 130 may each be about 1 mm to about 50 mm. In some embodiments, a thickness t2 of the liquid crystal layer 123a may be less than each of the thickness t1 of the first glass plate 110 and the thickness t3 of the second glass plate 130. For example, the thickness t2 of the liquid crystal layer 123a may be about 0.2 mm to about 1.0 mm. As the thickness t2 of the liquid crystal layer 123a decreases, the weight of the liquid crystal panel 100A may decrease. For example, when the thickness t2 of the liquid crystal layer 123a is about 1/10 of each of the thickness t1 of the first glass plate 110 and the thickness t3 of the second glass plate 130, the weight of the liquid crystal panel 100A may be reduced by about 30% than when the thickness t2 of the liquid crystal layer 123a is the same as each of the thickness t1 of the first glass plate 110 and the thickness t3 of the second glass plate 130. In addition, as the thickness t2 of the liquid crystal layer 123a decreases, a thickness of the liquid crystal cell 120a also decreases. Therefore, a thickness of a gas layer between the second main surface 110M2 of the first glass plate 110 and the first main surface 120M1 of the liquid crystal cell 120a and a thickness of a gas layer between the second main surface 120M2 of the liquid crystal cell 120a and the first main surface 130M1 of the second glass plate 130 may increase, and thus, the performance of insulation may increase. However, as the thickness t2 of the liquid crystal layer 123a decreases, the liquid crystal layer 123a may not be easily handled. In particular, when the thickness t2 of the liquid crystal layer 123a is less than about 1.0 mm, a strengthening process, such as heat-strengthening or chemical strengthening, may not be easily performed. In some embodiments, the liquid crystal layer 123a may not undergo a strengthening process such as heat-strengthening or chemical strengthening. Therefore, in this case, the thickness t2 of the liquid crystal layer 123a may be less than or equal to about 1.0 mm. However, when the thickness t2 of the liquid crystal layer 123a is less than about 0.2 mm, handling of the liquid crystal layer 123a may not be easy, and thus, manufacturing of the liquid crystal panel 100A may not be easy. Accordingly, the thickness t2 of the liquid crystal layer 123a may be greater than or equal to about 0.2 mm.

Each of the first glass plate 110 and the second glass plate 130 may include any glass material that includes soda lime, borosilicate glass, alumino silicate glass, boroaluminosilicate glass, or a combination thereof. In some embodiments, the first glass plate 110 and the second glass plate 130 may include soda lime glass commonly used for windows.

According to an embodiment, the first sheet 121a and the second sheet 122a may be respectively arranged on the widest side of the liquid crystal layer 123a facing each other with the liquid crystal layer 123a therebetween to protect the liquid crystal layer 123a from external impact. The first sheet 121a and the second sheet 122a may be sheets each having a relatively small thickness, compared to the first glass plate 110 and the second glass plate 130. For example, each of the first sheet 121a and/or the second sheet 122a may have a thickness less than or equal to about 1 mm, less than or equal to about 0.9 mm, less than or equal to about 0.8 mm, or less than or equal to about 0.7 mm. Additionally or alternatively, each of the first sheet 121a and/or the second sheet 122a may have a thickness greater than or equal to about 0.05 mm, greater than or equal to about 0.1 mm, greater than or equal to about 0.2 mm, greater than or equal to about 0.3 mm, greater than or equal to about 0.4 mm, or greater than or equal to about 0.5 mm. For example, each of the first sheet 121a and/or the second sheet 122a may have a thickness of about 0.3 mm to about 1.0 mm or a thickness of about 0.5 mm. The thickness of the first sheet 121a and the thickness of the second sheet 122a may be the same as or different from each other.

According to an embodiment, the first sheet 121a and/or the second sheet 122a may include or may be formed of a glass material, a ceramic material, a glass-ceramic material, a polymer material, or a combination thereof. In an embodiment, the first sheet 121a and/or the second sheet 122a may include glass having a low coefficient of thermal expansion (CTE). In some embodiments, the first sheet 121a and/or the second sheet 122a may include aluminosilicate glass. Additionally or alternatively, the first sheet 121a and/or the second sheet 122a may include alkali-free glass that is free from or substantially free from alkali metal or a component including alkali metal. For example, the alkali-free glass may include R2O of 0.1 mol % or less, 0.05 mol % or less, or 0.01 mol % or less, which is expressed on the basis of oxide, wherein R is one or more of Li, Na, and K. The alkali-free glass may help avoid alkali migration from the first sheet 121a and/or the second sheet 122a to the liquid crystal layer 123a. In some embodiments, the first sheet 121a and/or the second sheet 122a may include alkali-containing glass including alkali metal or a compound including alkali metal. For example, the alkali-containing glass may include R2O of 1 mol % or more, 5 mol % or more, or 10 mol % or more, which is expressed on the basis of oxide, where R is one or more of Li, Na, and K. Additionally or alternatively, the alkali-containing glass may be alkali aluminosilicate glass. Compositions of the first sheet 121a and the second sheet 122a may be the same as or different from each other.

According to an embodiment, the first sheet 121a and the second sheet 122a may be spaced apart from each other to define a cell gap therebetween, and the liquid crystal layer 123a may be arranged within the cell gap. Additionally or alternatively, the first sheet 121a and the second sheet 122a are arranged substantially parallel to each other. A thickness of the cell gap may refer to a distance between the first sheet 121a and the second sheet 122a. In some embodiments, the cell gap may be about 0.2 mm to about 1.0 mm.

The performance of the liquid crystal layer 123a may be sensitive to an interval between the first sheet 121a and the second sheet 122a. In some embodiments, the first sheet 121a and the second sheet 122a may have precise thickness uniformity and/or surface smoothness that enable the desired performance of the liquid crystal layer 123a by enabling a precise and uniform interval. For example, the first sheet 121a and/or the second sheet 122a may be fusion-molded glass sheets. For example, the first sheet 121a and/or the second sheet 122a may be fusion-molded glass sheets that may be commercially obtained as EAGLE XG® glass substrates from Corning Incorporated® (Corning, N.Y.) or flexible glass sheets that may be commercially obtained as Willow® Glass from Corning Incorporated® (Corning, N.Y.). The fusion-molded glass sheets described above may exhibit desired thickness uniformity and surface characteristics that enable the desired performance of a liquid crystal material. The fusion-molded glass sheets may be identified by the presence of a fusion line due to the fusion of a separate glass layer into a single glass sheet during molding.

The first sheet 121a and/or the second sheet 122a may be configured to be exactly smooth and flat to enable an accurate and uniform interval that enables the desirable performance of a liquid crystal material by improving accurate thickness uniformity and/or surface smoothness. For example, one method of minimizing out-of-plane distortion, i.e., quantifying the out-of-plane distortion of glass includes evaluating the waviness and/or roughness of a surface of the glass. "Fine creases" is a term that includes both waviness and roughness.

According to an embodiment, the liquid crystal layer 123a of the liquid crystal cell 120a may be controlled to adjust a transmittance of the liquid crystal panel 100A. The liquid crystal layer 123a may be operated to adjust the transmittance of the liquid crystal panel 100A. (e.g., the transmittance of the liquid crystal panel 100A may be adjusted by applying an electric field to the liquid crystal layer 123a and operating a contrast/low contrast state.) Here, the liquid crystal layer 123a may include a polymer dispersed liquid crystal (PDLC) material, a guest host liquid crystal material, a cholesteric liquid crystal (CHLC) material, a chiral liquid crystal material, a nematic liquid crystal material, or a combination thereof.

According to an embodiment, the liquid crystal panel 100A may include an external driving device 180 located outside the liquid crystal cell 120a. The external driving device 180 may be configured to supply electrical energy to the liquid crystal cell 120a, and the liquid crystal cell 120a may be configured to control a transmittance of light according to an amount of electrical energy supplied from the external driving device 180.

The liquid crystal panel 100A may further include a first spacer 140 and a second spacer 150 for spacing the plurality of glass plates (e.g., the first glass plate 110 and the second glass plate 130) from each other. The first glass plate 110 and the liquid crystal cell 120a may be spaced apart from each other by the first spacer 140. In other words, the first spacer 140 may be located between the first glass plate 110 and the liquid crystal cell 120a. The second glass plate 130 and the liquid crystal cell 120a may be spaced apart from each other by the second spacer 150. In other words, the second spacer 150 may be located between the second glass plate 130 and the liquid crystal cell 120a. The first spacer 140 and the second spacer 150 may include any material, for example, metal such as aluminum, or a plastic composite material such as a warm edge spacer. Each of a space defined by the first glass plate 110, the liquid crystal cell 120a, and the first spacer 140 and a space defined by the liquid crystal cell 120a, the second glass plate 130, and the second spacer 150 may be filled with a gas that may include air, an inert gas, such as Ar or Kr, or a combination thereof. The gas may improve the insulation performance of the liquid crystal panel 100A. One surface of the first spacer 140 perpendicular to the second direction (the Y direction) may contact the first sheet 121a of the liquid crystal cell 120a. In addition, the other surface of the first spacer 140 facing the one surface may contact the first glass plate 110. One surface of the second spacer 150 perpendicular to the second direction (the Y direction) may contact the second sheet 122a of the liquid crystal cell 120a. In addition, the other surface of the second spacer 150 facing the one surface may contact the second glass plate 130.

According to an embodiment, the circumferences of the first glass plate 110 and the second glass plate 130 may be aligned with the circumference of the liquid crystal cell 120a, the first spacer 140, and the second spacer 150. For example, the first edge surface 110E1 of the first glass plate 110 may be located on the same plane an upper surface 140US of the first spacer 140, and the first edge surface 130E1 of the second glass plate 130 may be located on the same plane as an upper surface 150US of the second spacer 150. Similar to the first edge surface 110E1 of the first glass plate 110, except for the first edge surface 110E1 of the first glass plate 110, another edge surface (e.g., the second edge surface 110E2, the third edge surface 110E3, or the fourth edge surface 110E4) may also be located on the same plane as the facing other surface of the first spacer 140. In addition, except for the first edge surface 130E1 of the second glass plate 130, another edge surface (e.g., the second edge surface 130E2, the third edge surface 130E3, or the fourth edge surface 130E4) may also be located on the same plane as the facing other surface of the second spacer 150.

According to an embodiment, the liquid crystal panel 100A may include a plurality of first low-e coating layers 160 arranged to be spaced apart from one another in a third direction (a Z direction) on the second main surface 110M2 of the first glass plate 110, and a plurality of second low-e coating layers 170 arranged to be spaced apart from one another in the third direction (the Z direction) on the first main surface 130M1 of the second glass plate 130. The first low-e coating layers 160 and the second low-e coating layers 170 may be layers coated with a material having a low emissivity. The emissivity refers to an energy ratio in which an object absorbs external light energy and then radiates the absorbed light energy.

The liquid crystal panel 100A according to an embodiment may have a triple window structure including the liquid crystal cells 120a arranged between the first glass plate and the second glass plate 130. Here, an insulation effect may be high due to a space between the first glass plate 110 and the liquid crystal cell 120a and a space between the second glass plate 130 and the liquid crystal cell 120a. In addition, compared to existing glass, the liquid crystal cell 120a may include an electronic device or the like, and thus may be sensitive to external impact. However, the liquid crystal cell 120a may be protected from external impact by the first glass plate 110 and the second glass plate 130.

Figure 2B:
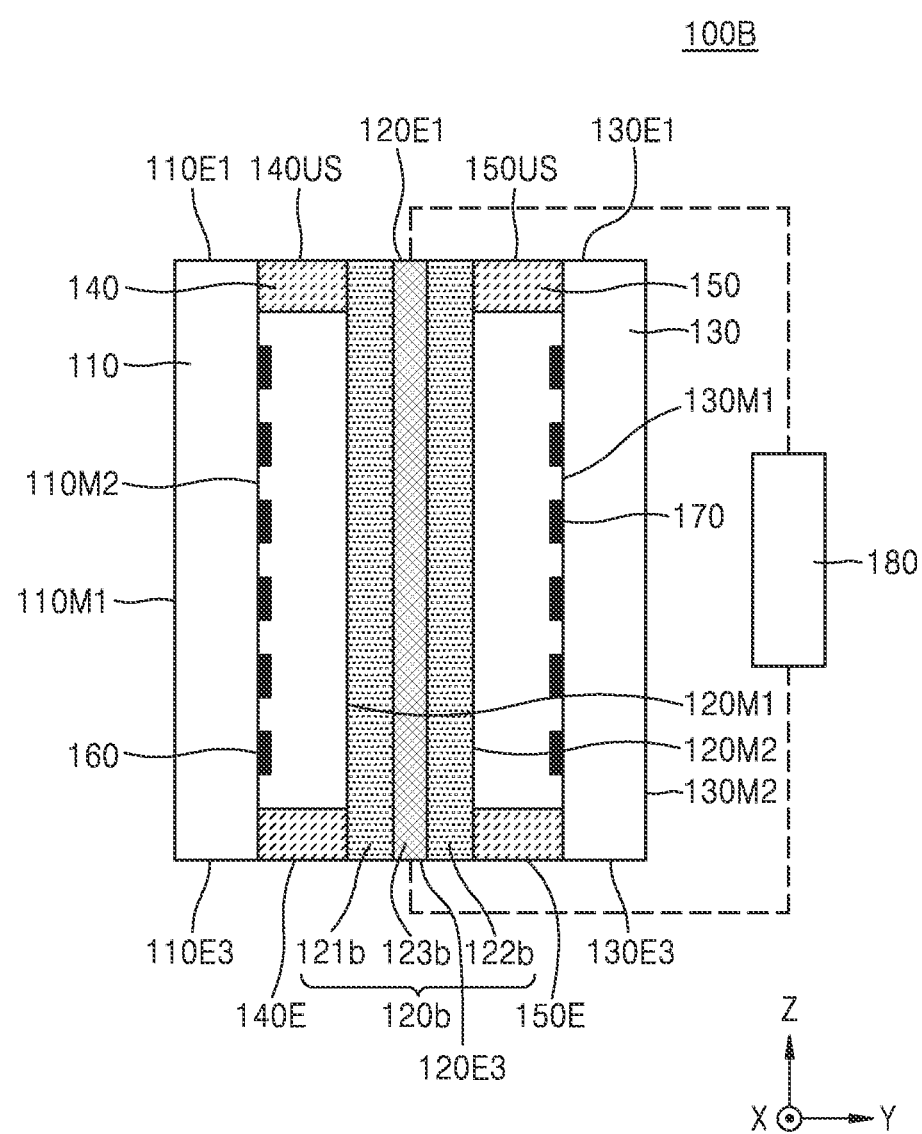
FIG. 2B is a cross-sectional view corresponding to the cross-sectional view of FIG. 2A, according to an embodiment.

FIG. 2B is a cross-sectional view corresponding to the cross-sectional view of FIG. 2A, according to an embodiment. A liquid crystal panel 100B illustrated in FIG. 2B is almost the same as or similar to the liquid crystal panel 100A illustrated in FIG. 2A, except that a composition of a liquid crystal layer 123b is different. Accordingly, the description of the components described with reference to FIG. 2A will be omitted.

According to an embodiment, a liquid crystal cell 120b may include a first sheet 121b, a second sheet 122b spaced apart from the first sheet 121b, and the liquid crystal layer 123b arranged between the first sheet 121b and the second sheet 122b. The liquid crystal panel 100B may include an external driving device 180 located outside the liquid crystal cell 120b. The external driving device 180 may be configured to supply electrical energy to the liquid crystal cell 120b, and the liquid crystal cell 120b may be configured to adjust turbidity according to an amount of electrical energy supplied from the external driving device 180. The liquid crystal layer 123b may be controlled to adjust the turbidity of the liquid crystal panel 100B. For example, the liquid crystal layer 123b may be a device that may switch among a transparent mode that transmits light across the entire surface, a haze mode that scatters light at a wide angle across the entire surface but allows a portion of the light to pass through, and a black mode that scatters light across the entire surface to allow a low transmittance. For example, in the transparent mode, a voltage may not be applied to the liquid crystal layer 123b from the external driving device 180, and the liquid crystal layer 123b may remain transparent as a whole. In the haze mode, when a first voltage is applied to the liquid crystal layer 123b from the external driving device 180, an object beyond the liquid crystal layer 123b (e.g., a second glass plate 130) may be barely recognized when viewed from a first main surface 110M1 of a first glass plate 110. In the black mode, when a second voltage higher than the first voltage is applied to the liquid crystal layer 123b from the external driving device 180, the liquid crystal layer 123b may be completely opaque as a whole. Therefore, when viewed from the first main surface 110M1 of the first glass plate 110, the object beyond the liquid crystal layer 123b may not be completely recognized. According to an embodiment, the liquid crystal cell 120b may include a PDLC, a CHLC, a phase grating liquid crystal (PGLC), or a combination thereof.

Figure 2C:
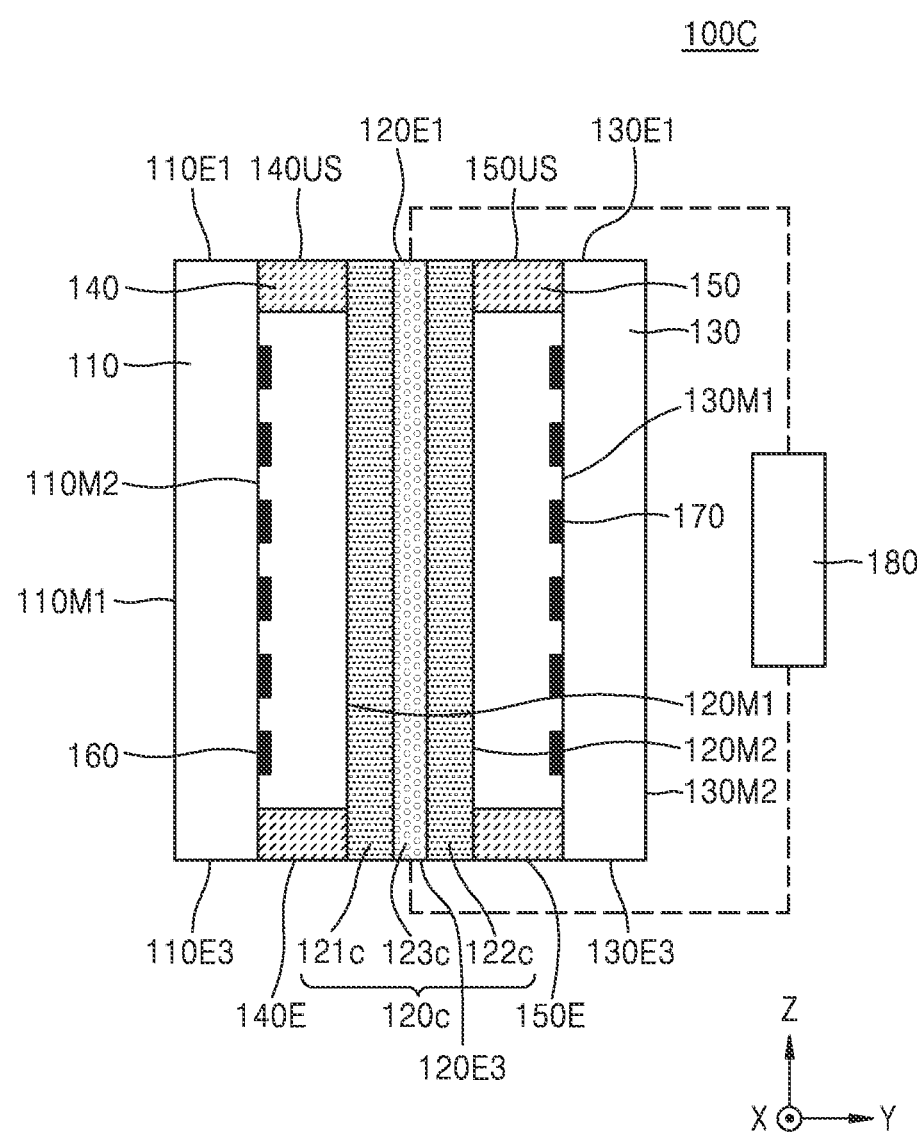
FIG. 2C is a cross-sectional view corresponding to the cross-sectional view of FIG. 2A, according to an embodiment.

FIG. 2C is a cross-sectional view corresponding to the cross-sectional view of FIG. 2A, according to an embodiment. A liquid crystal panel 100C illustrated in FIG. 2C is almost the same as or similar to the liquid crystal panel 100A illustrated in FIG. 2A, except that a composition of a liquid crystal layer 123c is different. Accordingly, the description of the components described with reference to FIG. 2A will be omitted.

According to an embodiment, a liquid crystal cell 120c may include a first sheet 121c, a second sheet 122c spaced apart from the first sheet 121c, and the liquid crystal layer 123c arranged between the first sheet 121c and the second sheet 122c. Unlike the liquid crystal panels 100A and 100B illustrated in FIGS. 2A and 2B, the liquid crystal panel 100C does not include the external driving device 180 (illustrated in FIGS. 2A and 2B) located outside the liquid crystal cells 120a and 120b. The liquid crystal layer 123c may include a solar cell substrate. Here, the solar cell substrate may be a device capable of directly converting, into electricity, sunlight incident through a plurality of glass plates 110 and a 130 and a plurality of sheets (e.g., the first sheet 121c and the second sheet 122c). The solar cell substrate may be in the form of a diode including a PN junction. The solar cell substrate may include a light absorption layer, and at this time, may be classified into various types of solar cells according to a material of the light absorption layer. For example, the solar cell substrate may be classified into a silicon solar cell using silicon as a light absorption layer, a semiconductor compound solar cell using copper-indium-gallium selenide (CIGS) or cadmium telluride (CdTe) as a light absorption layer, a dye-sensitized solar cell in which light-sensitive dye molecules with electrons excited by absorption of visible light are adsorbed on surfaces of nanoparticles of a porous film, or a stacked solar cell in which a plurality of amorphous silicon layers are stacked. In addition, the solar cell substrate may be classified into a bulk type (including single crystal or polycrystal) and a (amorphous or microcrystal) thin film type.

According to an embodiment, the liquid crystal layer 123c may include the solar cell substrate, and thus, the liquid crystal panel 100C may self-generate electrical energy even when not including the external driving device 180 illustrated in FIGS. 2A and 2B.

Figure 2D:
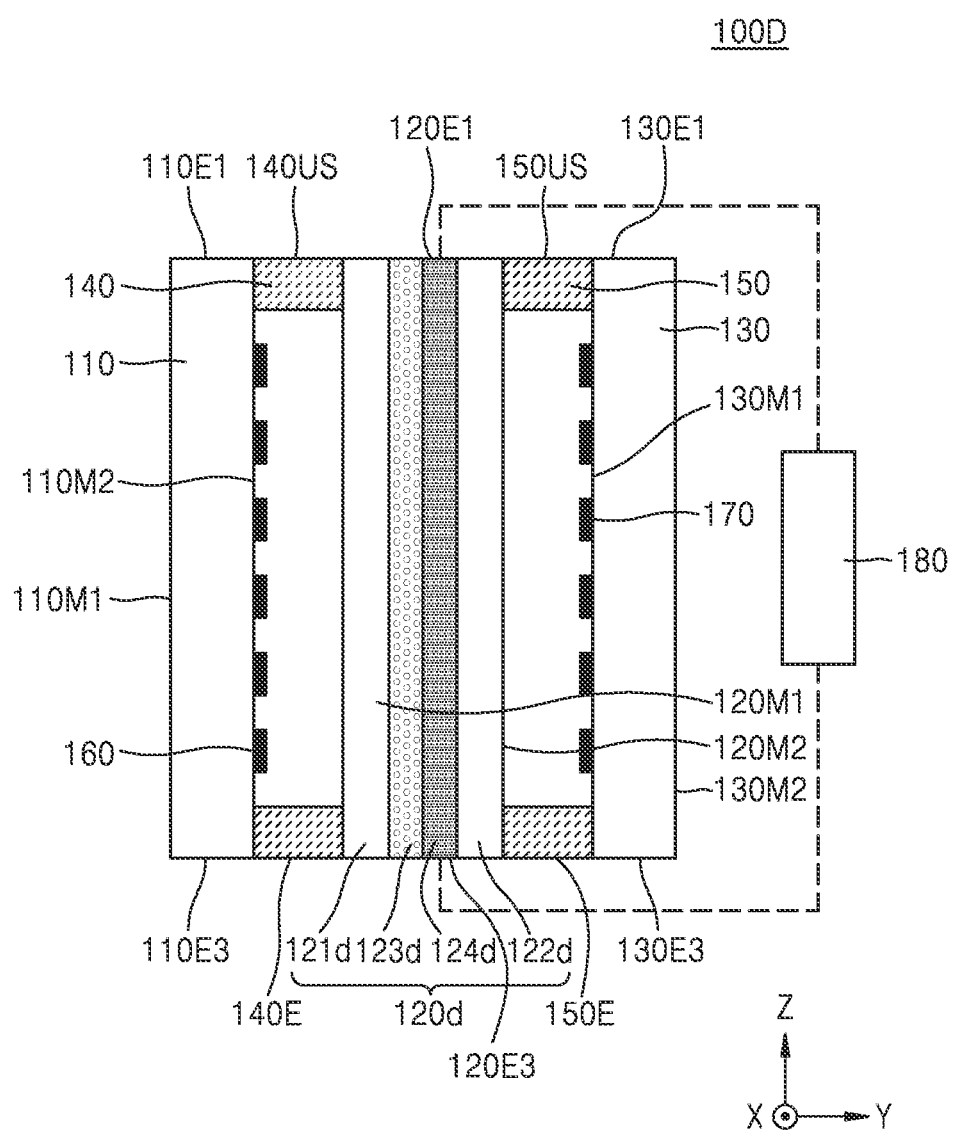
FIG. 2D is a cross-sectional view corresponding to the cross-sectional view of FIG. 2A, according to an embodiment.

FIG. 2D is a cross-sectional view corresponding to the cross-sectional view of FIG. 2A, according to an embodiment. A liquid crystal panel 100D illustrated in FIG. 2D is almost the same as or similar to the liquid crystal panel 100A illustrated in FIG. 2A, except that compositions of a first liquid crystal layer 123d and a second liquid crystal layer 124d are different. Accordingly, the description of the components described with reference to FIG. 2A will be omitted.

According to an embodiment, a liquid crystal cell 120d may include a first sheet 121d, a second sheet 122d spaced apart from the first sheet 121d, and the first liquid crystal layer 123d and the second liquid crystal layer 124d arranged between the first sheet 121d and the second sheet 122d. Unlike the liquid crystal panel 100A illustrated in FIG. 2A, the liquid crystal panel 100D may include a plurality of liquid crystal layers (e.g., the first liquid crystal layer 123d and the second liquid crystal layer 124d). Here, the first liquid crystal layer 123d may have substantially the same configuration as the liquid crystal layer 123c illustrated in FIG. 2C. In other words, the first liquid crystal layer 123d may include a solar cell substrate. The first liquid crystal layer 123d including the solar cell substrate may self-generate electrical energy even when not including the external driving device 180 illustrated in FIGS. 2A and 2B. The second liquid crystal layer 124d may have substantially the same configuration as the liquid crystal layer 123c illustrated in FIG. 2C. In other words, the second liquid crystal layer 124d may be controlled to adjust a transmittance of the liquid crystal panel 100D. The second liquid crystal layer 124d may be operated to adjust the transmittance of the liquid crystal panel 100D. (For example, the transmittance of the liquid crystal panel 100D may be adjusted by applying an electric field to the second liquid crystal layer 124d and operating a high-contrast/low-contrast state). Here, the second liquid crystal layer 124d may include a PDLC material, a guest host liquid crystal material, a CHLC material, a chiral liquid crystal material, a nematic liquid crystal material, or a combination thereof.

Unlike the liquid crystal panels 100A and 100B illustrated in FIGS. 2A and 2B, the liquid crystal panel 100D may not include the external driving device 180 illustrated in FIGS. 2A and 2B, and may drive the second liquid crystal layer 124d by using electrical energy generated by the first liquid crystal layer 123d.

Figure 3A:
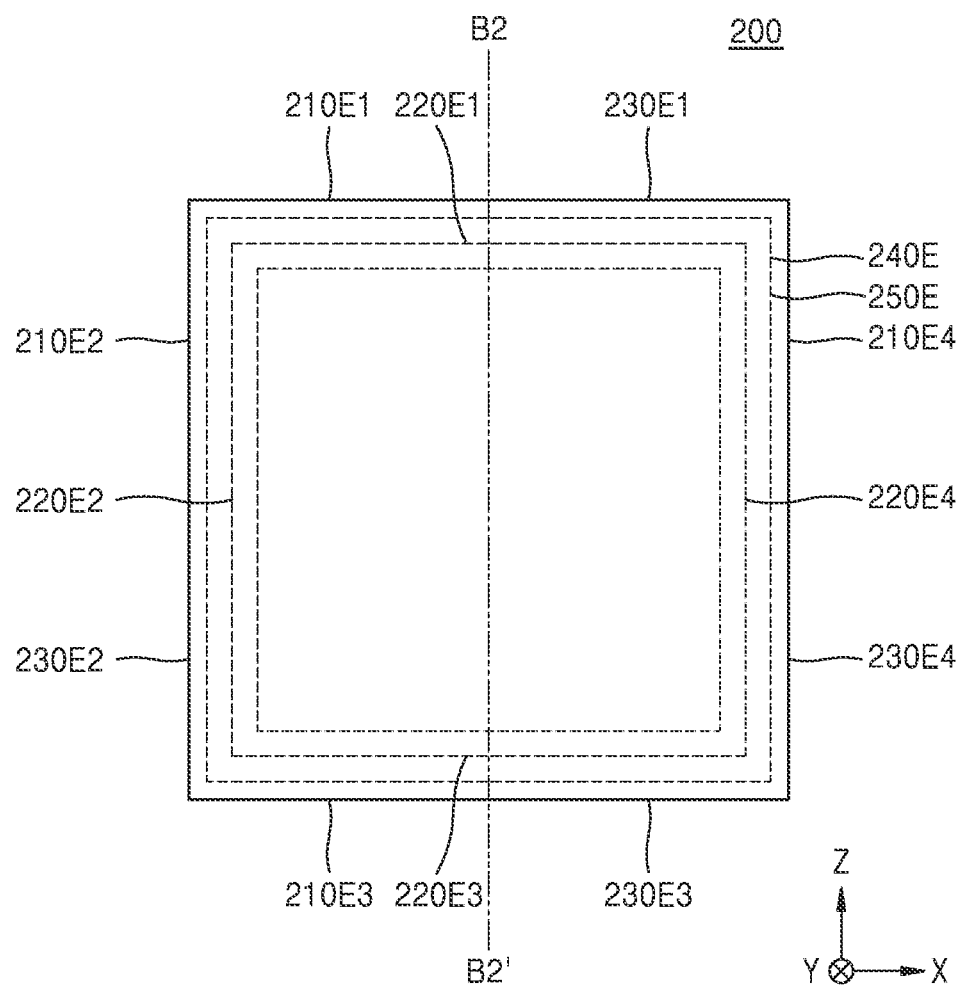
FIG. 3A is a plan view of a liquid crystal panel according to an embodiment.
Figure 3B:
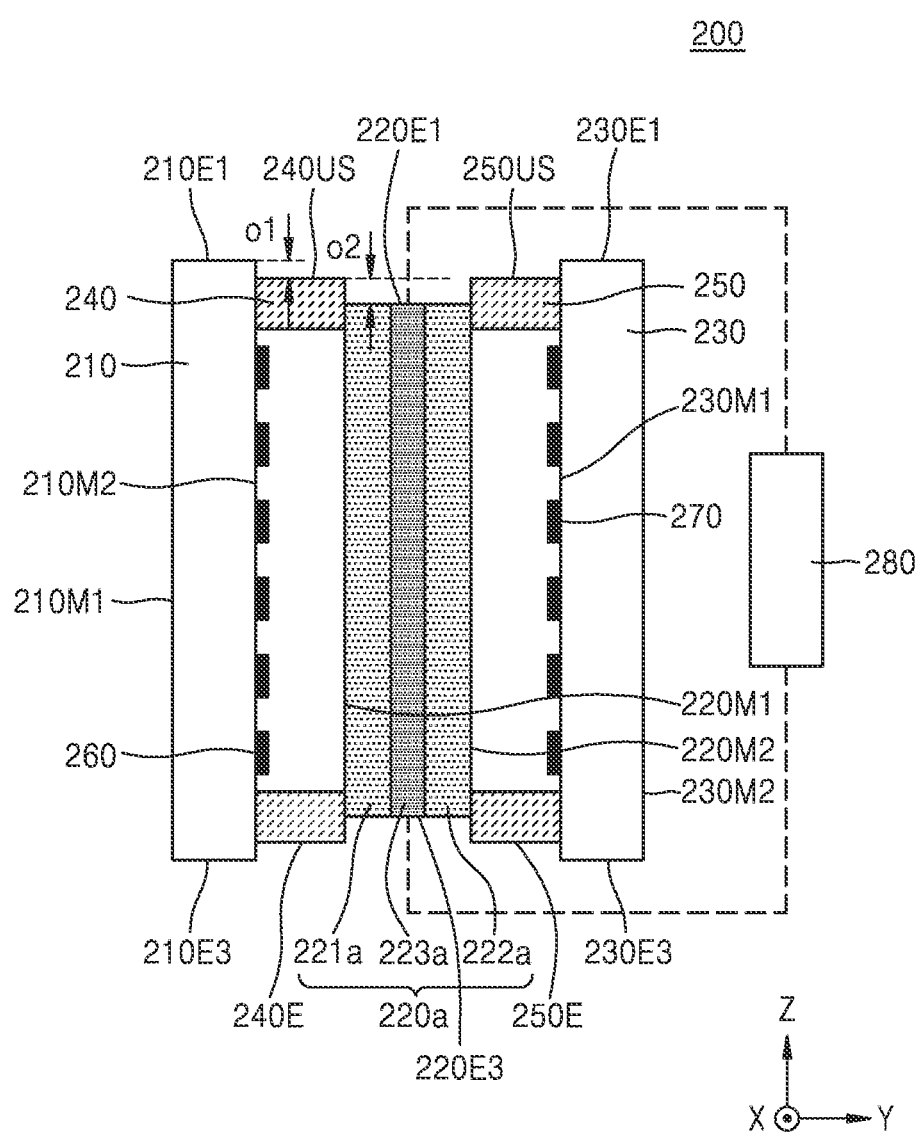
FIG. 3B is a cross-sectional view taken along line B2-B2' of FIG. 3A.

FIG. 3A is a plan view of a liquid crystal panel 200 according to an embodiment. In addition, FIG. 3B is a cross-sectional view taken along line B2-B2' of FIG. 3A. The liquid crystal panel 200 illustrated in FIGS. 3A and 3B is almost the same as or similar to the liquid crystal panel 100A illustrated in FIG. 2A, except that a first spacer 240, a second spacer 250, and a liquid crystal cell 220a are spaced apart from a first edge surface 210E1 and a third edge surface 210E3 of a first glass plate 210 and a first edge surface 230E1 and a third edge surface 230E3 of a second glass plate 230. Accordingly, the same description of components of FIGS. 3A and 3B as that of the components of FIG. 2A will be omitted.

Referring to FIGS. 3A and 3B, a portion of the first spacer 240 and a portion of the second spacer 250 may be offset inward from circumferences of the first glass plate 210 and the second glass plate 230. In other words, a circumference 240E of the first spacer 240 and a circumference 250E of the second spacer 250 may be offset inward from the circumferences of the first glass plate 210 and the second glass plate 230 by a first distance 01. For example, the circumference 240E of the first spacer 240 and the circumference 250E of the second spacer 250 may be offset inward (in a-Z direction) from the first edge surface 210E1 of the first glass plate 210. In other words, the first edge surface 210E1 of the first glass plate 210 and the first edge surface 230E1 of the second glass plate 230 may not be located on the same plane as an upper surface 240US of the first spacer 240 and an upper surface 250US of the second spacer 250, respectively. The portion of the first spacer 240 and the portion of the second spacer 250 may be offset inward from the circumferences of the first glass plate 210 and the second glass plate 230, and thus, the first spacer 240 and the second spacer 250 may be further protected from damage due to physical contact and/or impact.

In addition, the liquid crystal cell 220a may be offset inward from the circumferences of the first glass plate 210 and the second glass plate 230. In other words, a circumference of the liquid crystal cell 220a may be offset inward from the circumferences of the first glass plate 210 and the second glass plate 230 by a second distance 02. For example, a first edge surface 220E1 of the liquid crystal cell 220a may be offset inward (in the −Z direction) from the first edge surface 210E1 of the first glass plate 210. A portion of the liquid crystal cell 220a may be offset inward from the circumferences of the first glass plate 210 and the second glass plate, and thus, the liquid crystal cell 220a may be further protected from damage due to physical contact and/or impact. Accordingly, the liquid crystal panel 200 may have more improved durability.

Figure 4A:
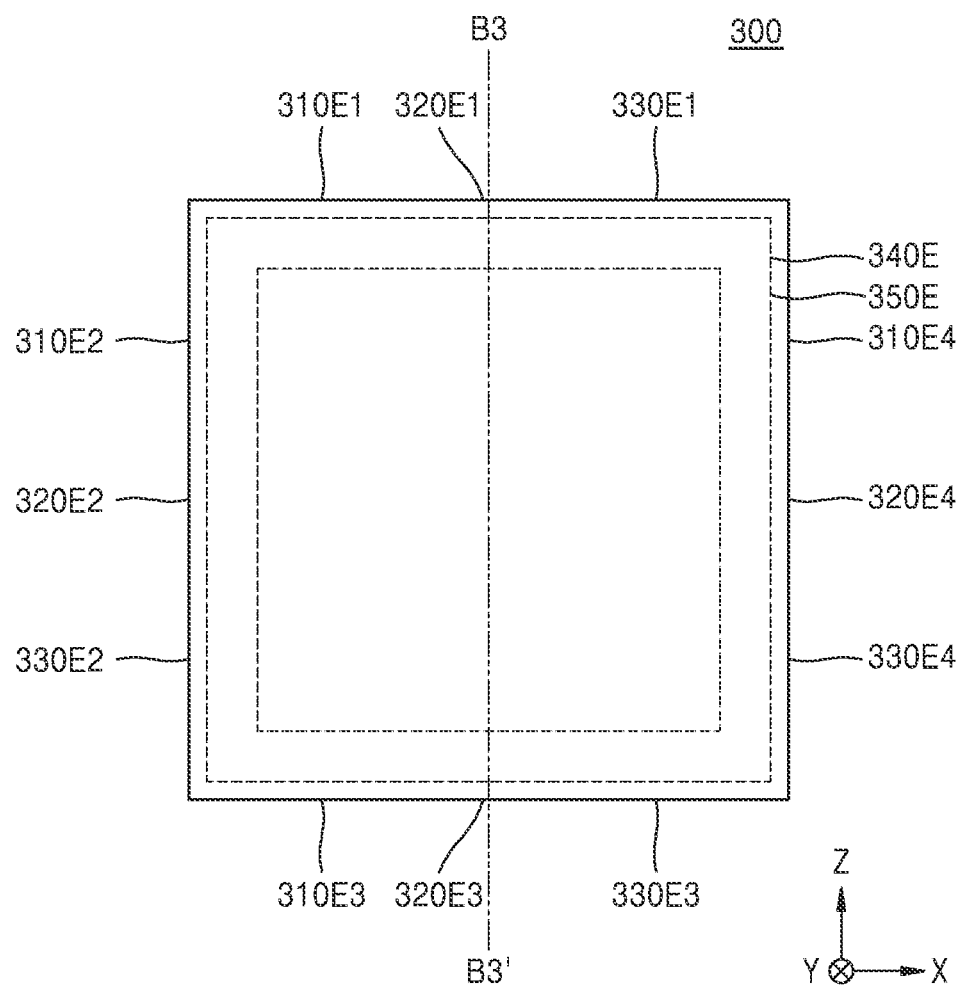
FIG. 4A is a plan view of a liquid crystal panel according to an embodiment.
Figure 4B:
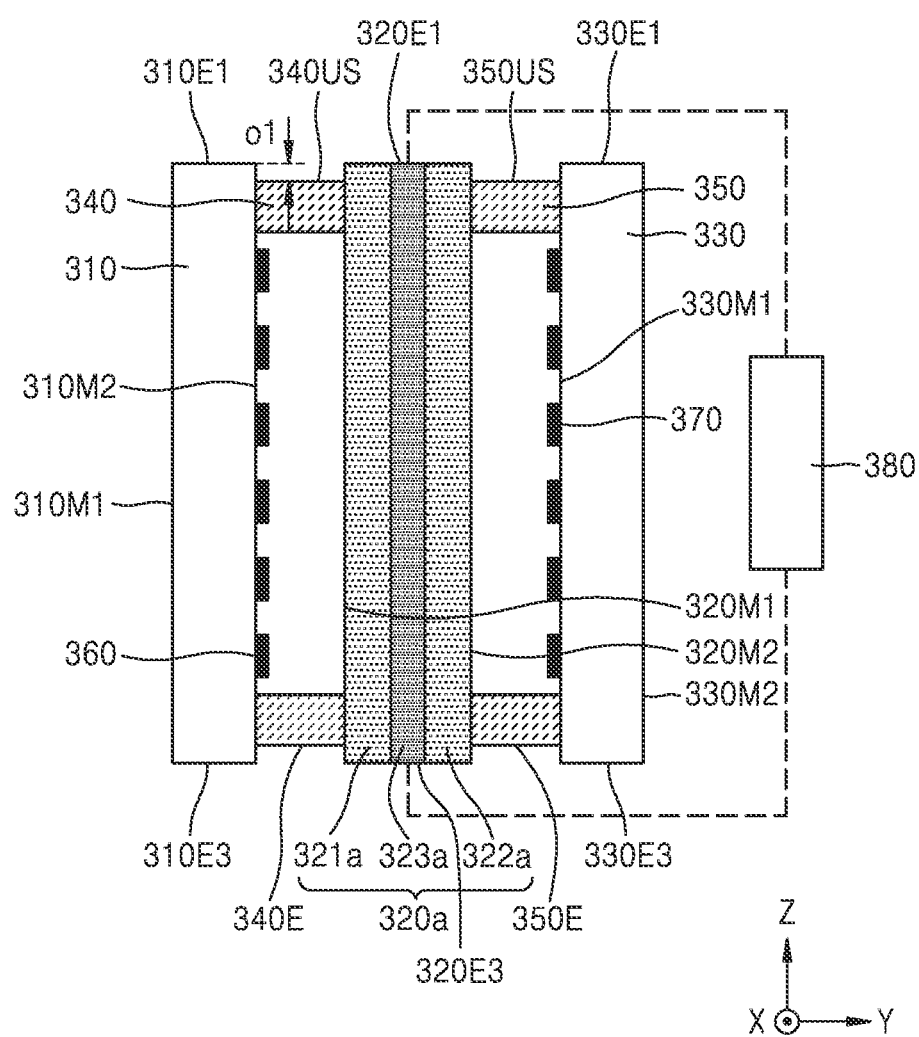
FIG. 4B is a cross-sectional view taken along line B3-B3' of FIG. 4A.

FIG. 4A is a plan view of a liquid crystal panel according to an embodiment, and FIG. 4B is a cross-sectional view taken along line B3-B3' of FIG. 4A. A liquid crystal panel 300 illustrated in FIGS. 4A and 4B is almost the same as or similar to the liquid crystal panel 100A illustrated in FIGS. 1 and 2A, except that a first spacer 340, a second spacer 350, and a liquid crystal cell 320a are spaced apart from a first edge surface 310E1 and a third edge surface 310E3 of a first glass plate 310, and a first edge surface 330E1 and a third edge surface 330E3 of a second glass plate 330. Accordingly, the same description of components of FIGS. 4A and 4B as that of the components of FIGS. 1 and 2A will be omitted.

Referring to FIGS. 4A and 4B, a portion of the first spacer 340 and a portion of the second spacer 350 may be offset inward from circumferences of the first glass plate 310 and the second glass plate 330. In other words, a circumference 340E of the first spacer 340 and a circumference 350E of the second spacer 350 may be offset inward from the circumferences of the first glass plate 310 and the second glass plate 330 by a first distance 01. For example, the circumference 340E of the first spacer 340 and the circumference 350E of the second spacer 350 may be offset inward (in a-Z direction) from a first edge surface 310E1 of the first glass plate 310. The portion of the first spacer 340 and the portion of the second spacer 350 may be offset inward from the circumferences of the first glass plate 310 and the second glass plate 330, and thus, the first spacer 340 and the second spacer 350 may be further protected from damage due to physical contact and/or impact.

In contrast, a circumference of the liquid crystal cell 320a may be aligned with the circumferences of the first glass plate 310 and the second glass plate 330. For example, in a third direction (a Z direction), a first edge surface 320E1 of the liquid crystal cell 320a and the first edge surface 310E1 of the first glass plate 310 may be located on the same plane, and a third edge surface 320E3 of the liquid crystal cell 320a and a third edge surface 310E3 of the first glass plate 310 may also be located on the same plane.

Figure 5A:
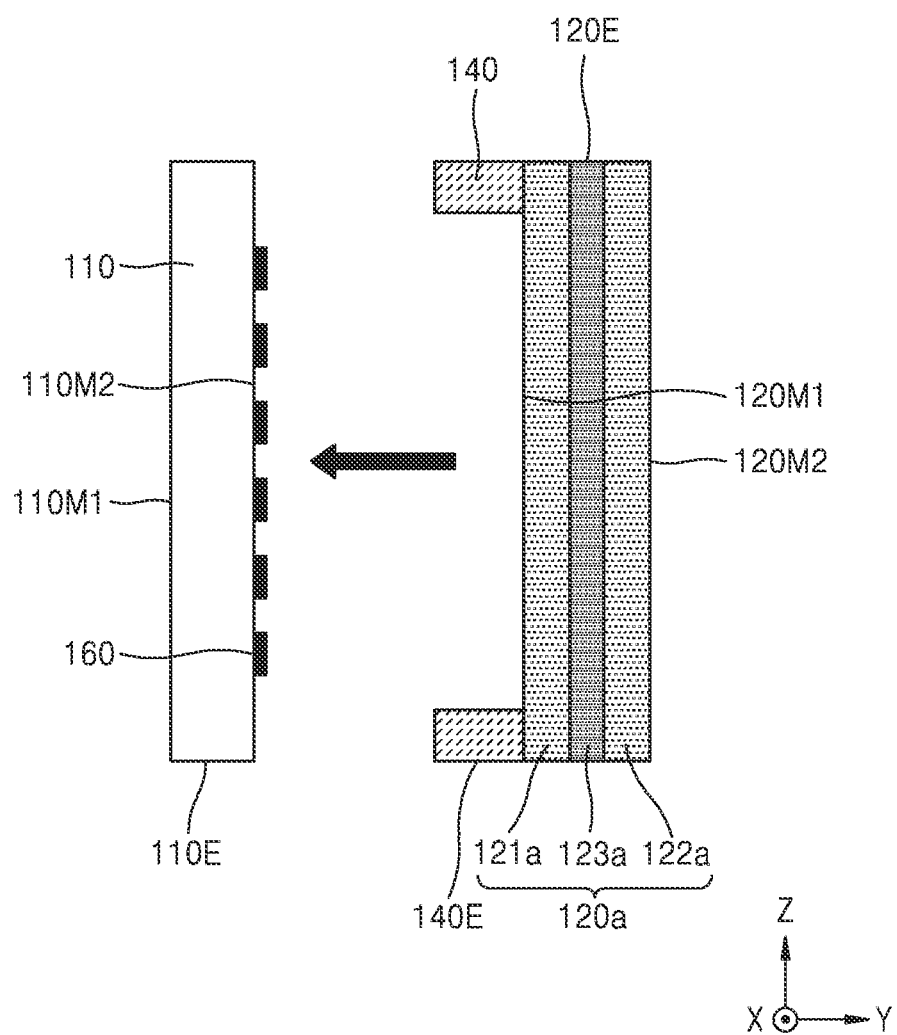
FIGS. 5A and 5B are cross-sectional views sequentially illustrating a method of manufacturing the liquid crystal panel illustrated in FIGS. 1 and 2A.
Figure 5B:
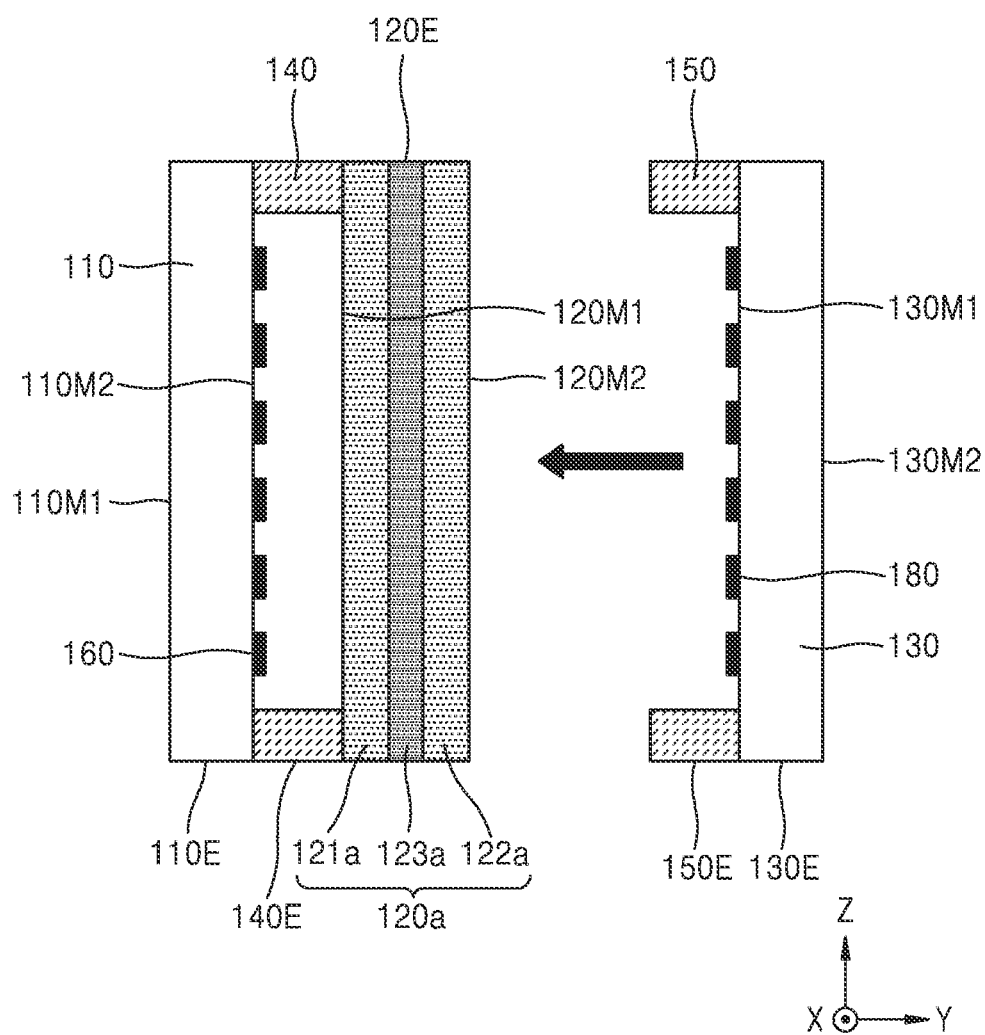

FIGS. 5A and 5B are cross-sectional views sequentially illustrating a method of manufacturing the liquid crystal panel 100A illustrated in FIGS. 1 and 2A.

Referring to FIG. 5A, a first spacer 140 may be attached onto a first main surface 120M1 of a liquid crystal cell 120a such that a circumference 140E of a first spacer 140 is aligned with a circumference 120E of the liquid crystal cell 120a. Subsequently, the liquid crystal cell 120a may be attached onto a second main surface 110M2 of a first glass plate 110 via the first spacer 140 such that the circumference 120E of the liquid crystal cell 120a is aligned with a circumference 110E of a first glass plate 110.

Referring to FIG. 5B, a second spacer 150 may be attached onto a first main surface 130M1 of a second glass plate 130 such that a circumference 150E of the second spacer 150 is aligned with a circumference 130E of the second glass plate 130. Subsequently, the second glass plate 130 may be attached onto a second main surface 120M2 of the liquid crystal cell 120a via the second spacer 150 such that the circumference 120E of the liquid crystal cell 120a is aligned with the circumference 130E of the second glass plate 130, and the circumference 150E of the second spacer 150 is aligned with the circumference 120E of the liquid crystal cell 120a. Accordingly, the liquid crystal panel 100A described with reference to FIGS. 1 and 2A may be manufactured.

Figure 6:
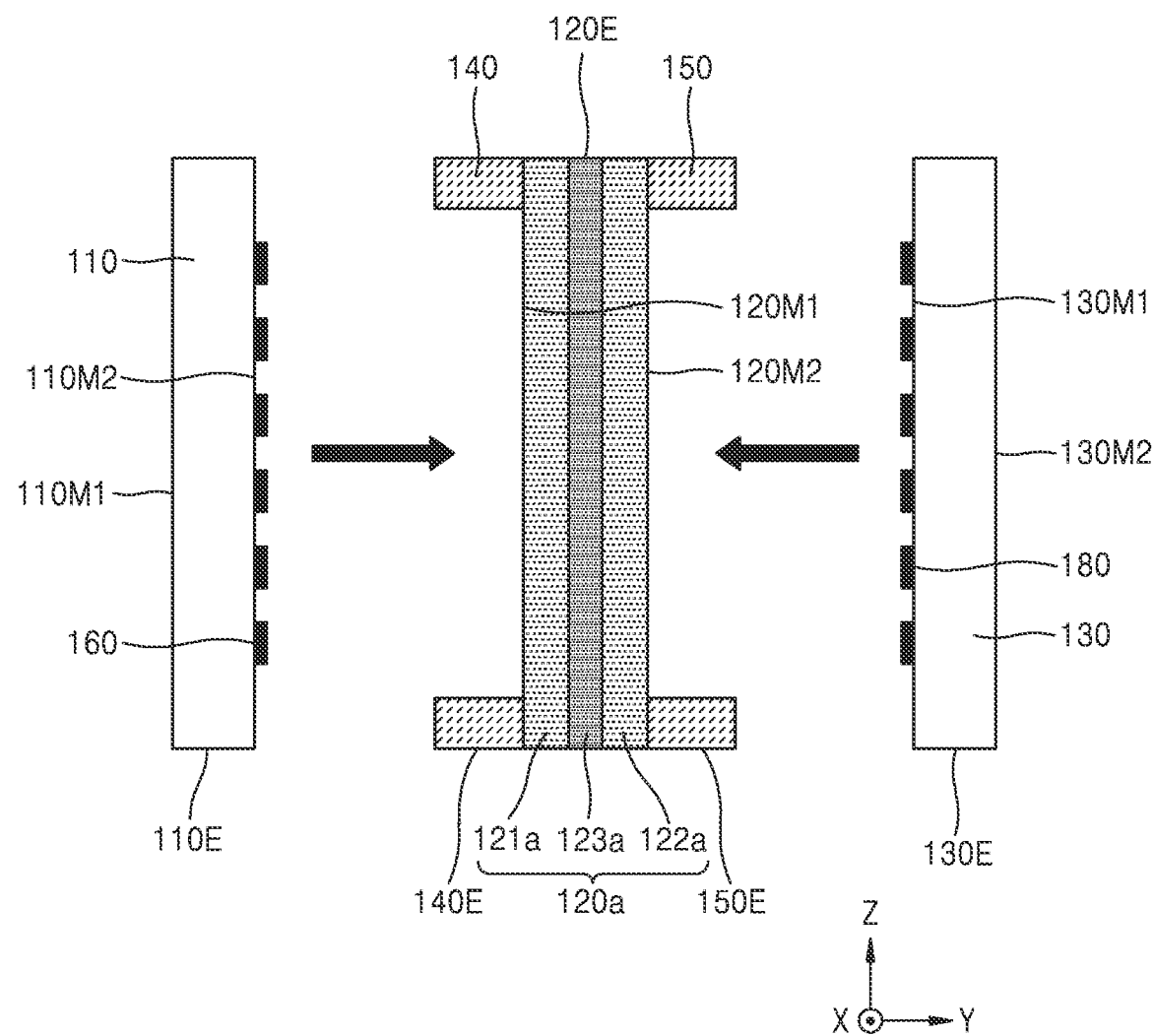
FIG. 6 is a cross-sectional view illustrating a method of manufacturing the liquid crystal panel illustrated in FIGS. 1 and 2A, according to an embodiment.

FIG. 6 is a cross-sectional view illustrating a method of manufacturing the liquid crystal panel 100A illustrated in FIGS. 1 and 2A, according to an embodiment.

Referring to FIG. 6, a first spacer 140 may be attached onto a first main surface 120M1 of a liquid crystal cell 120a such that a circumference 140E of the first spacer 140 is aligned with a circumference 120E of the liquid crystal cell 120a. In addition, a second spacer 150 may be attached onto a second main surface 120M2 of the liquid crystal cell 120a such that a circumference 150E of the second spacer 150 is aligned with the circumference 120E of the liquid crystal cell 120a. The first spacer 140 and the second spacer 150 may be simultaneously or sequentially attached to the liquid crystal cell 120a.

Subsequently, a first glass plate 110 may be attached onto a first main surface 120M1 of the liquid crystal cell 120a via the first spacer 140 such that the circumference 120E of the liquid crystal cell 120a is aligned with a circumference 110E of the first glass plate 110. In addition, a second glass plate 130 may be attached onto a second main surface 120M2 of the liquid crystal cell 120a via the second spacer 150 such that the circumference 120E of the liquid crystal cell 120a is aligned with a circumference 130E of the second glass plate 130. The first glass plate 110 and the second glass plate 130 may be simultaneously or sequentially attached to the liquid crystal cell 120a. Accordingly, the liquid crystal panel 100A described with reference to FIGS. 1 and 2A may be manufactured. According to the manufacturing method described with reference to FIG. 6, the alignment between the first spacer 140 and the second spacer 150 may be easily established.

Figure 7A:
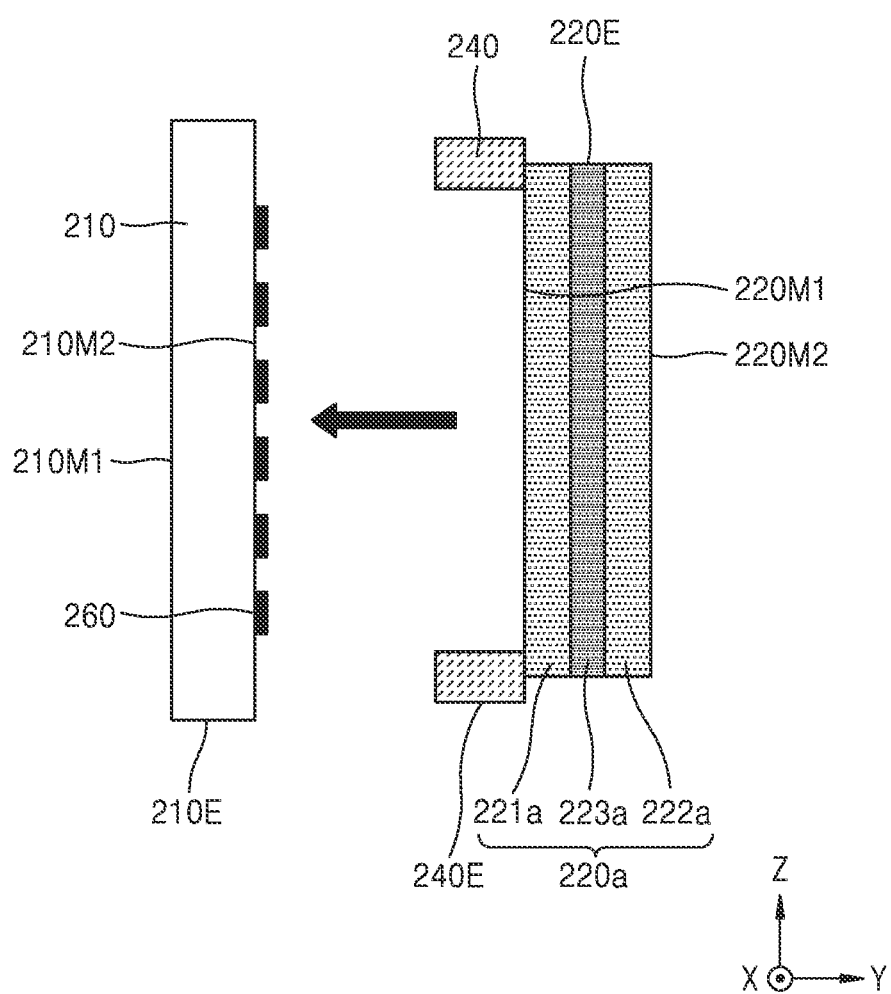
FIGS. 7A and 7B are cross-sectional views sequentially illustrating a method of manufacturing the liquid crystal panel illustrated in FIGS. 3A and 3B.
Figure 7B:
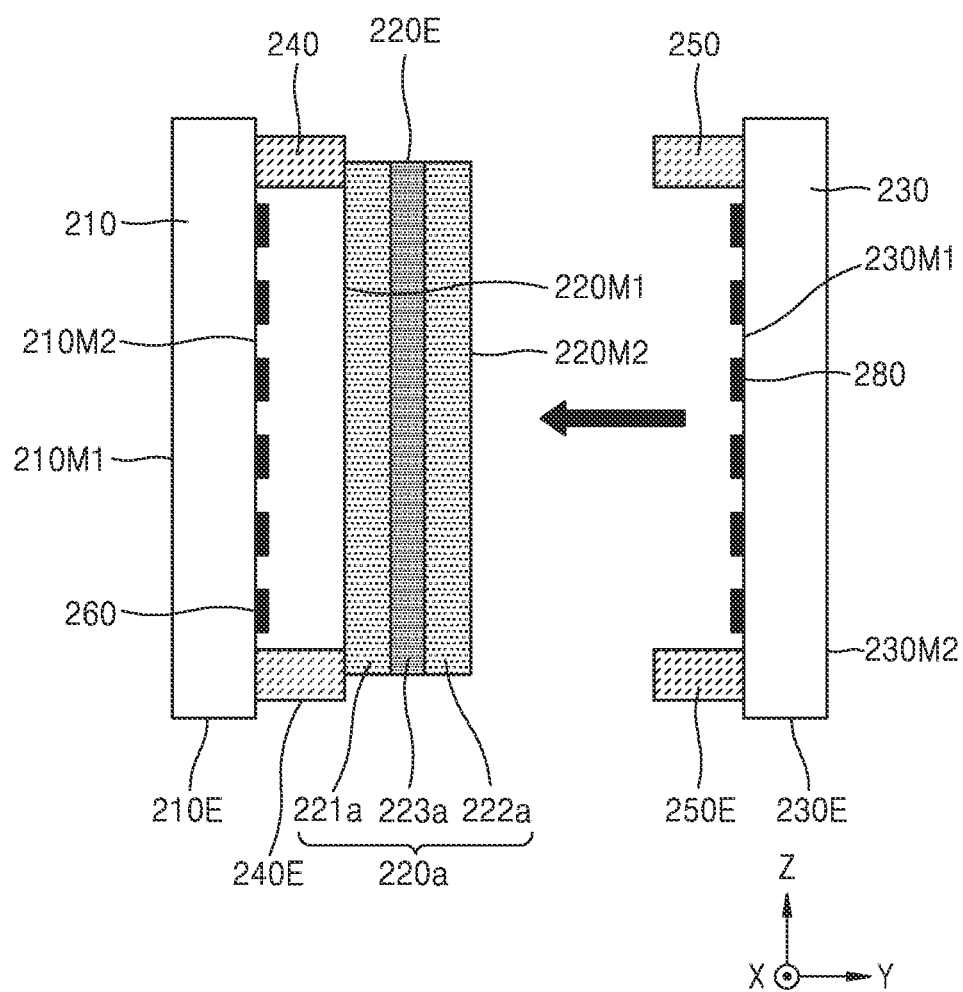

FIGS. 7A and 7B are cross-sectional views sequentially illustrating a method of manufacturing the liquid crystal panel 200 illustrated in FIGS. 3A and 3B.

Referring to FIG. 7A, a first spacer 240 may be attached onto a first main surface 220M1 of a liquid crystal cell 220a such that a circumference 240E of the first spacer 240 is offset outward from a circumference 220E of the liquid crystal cell 220a. Subsequently, the liquid crystal cell 220a may be attached onto a second main surface 210M2 of a first glass plate 210 via the first spacer 240 such that the circumference 240E of the first spacer 240 is offset inward from a circumference 210E of the first glass plate 210.

Referring to FIG. 7B, a second spacer 250 may be attached onto a first main surface 230M1 of a second glass plate 230 such that a circumference 250E of the second spacer 250 is offset inward from a circumference 230E of the second glass plate 230. Subsequently, the second glass plate 230 may be attached onto a second main surface 220M2 of the liquid crystal cell 220a via the second spacer 250 such that the circumference 250E of the second spacer 250E is offset outward from the circumference 220E of the liquid crystal cell 220a. Accordingly, the liquid crystal panel 200 described with reference to FIGS. 3A and 3B may be manufactured.

Figure 8:
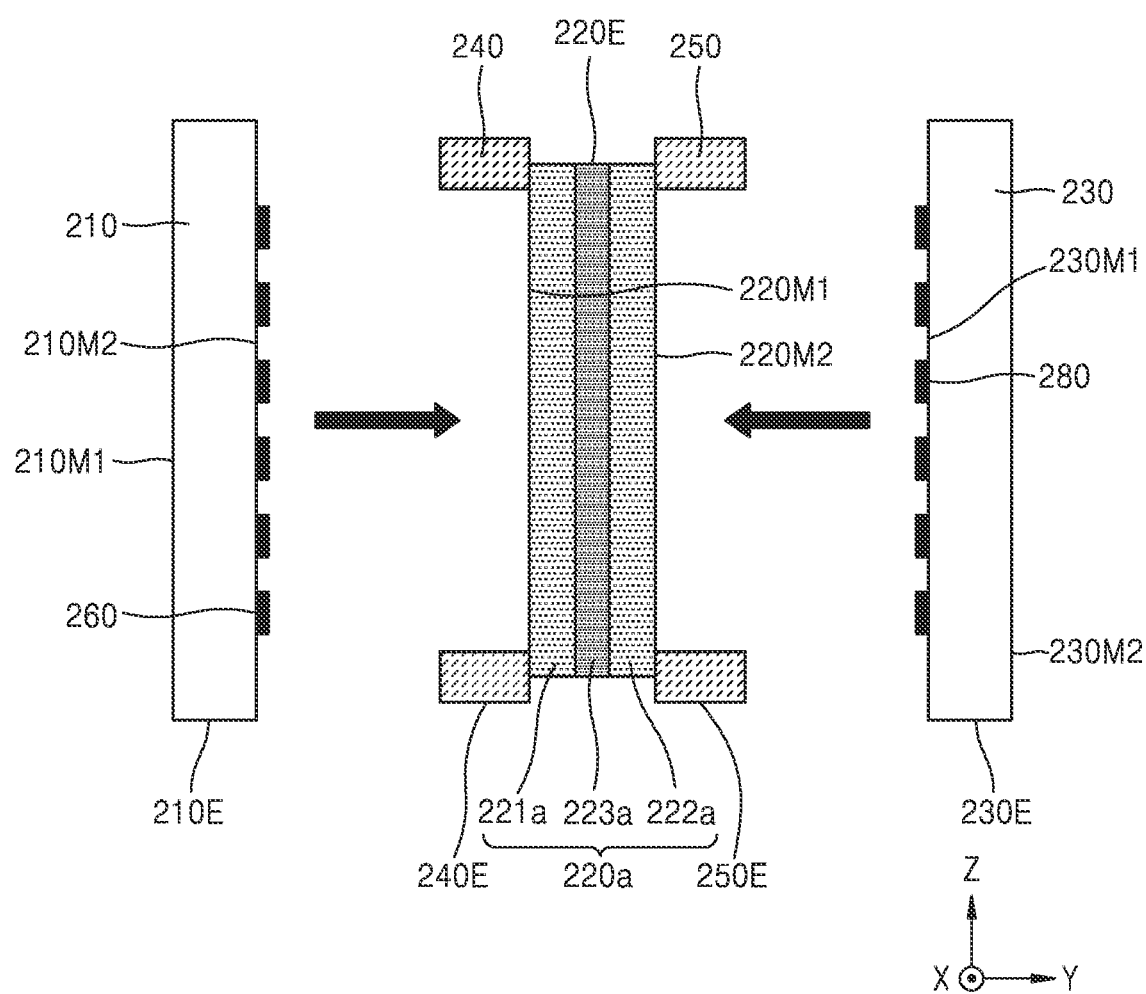
FIG. 8 is a cross-sectional view illustrating a method of manufacturing the liquid crystal panel illustrated in FIGS. 4A and 4B, according to an embodiment.

FIG. 8 is a cross-sectional view illustrating a method of manufacturing the liquid crystal panel 200 illustrated in FIGS. 3A and 3B, according to an embodiment.

Referring to FIG. 8, a first spacer 240 may be attached onto a first main surface 220M1 of a liquid crystal cell 220a such that a circumference 240E of the first spacer 240 protrudes outward from a circumference 220E of the liquid crystal cell 220a. In addition, a second spacer 250 may be attached onto a second main surface 220M2 of the liquid crystal cell 220a such that a circumference 250E of the second spacer 250 protrudes outward from the circumference 220E of the liquid crystal cell 220a. The first spacer 240 and the second spacer 250 may be simultaneously or sequentially attached to the liquid crystal cell 220a.

Subsequently, a first glass plate 210 may be attached onto the first main surface 220M1 of the liquid crystal cell 220a via the first spacer 240 such that the circumference 220E of the liquid crystal cell 220a is offset inward from a circumference 210E of the first glass plate 210. In addition, a second glass plate 230 may be attached onto the second main surface 220M2 of the liquid crystal cell 220a via the second spacer 250 such that the circumference 220E of the liquid crystal cell 220a is offset inward from a circumference 230E of the second glass plate 230. The first glass plate 110 and the second glass plate 130 may be simultaneously or sequentially attached to the liquid crystal cell 220a. Accordingly, the liquid crystal panel 200 described with reference to FIGS. 3A and 3B may be manufactured. According to the manufacturing method described with reference to FIG. 8, the alignment between the first spacer 240 and the second spacer 250 may be easily established.

According to the disclosure, a liquid crystal panel including first and second glass plates facing each other is provided. Here, the liquid crystal panel includes a liquid crystal cell arranged between the first and second glass plates. The liquid crystal cell may be spaced apart from the first and second glass plates via a spacer between the first and second glass plates, and an empty space may be provided between the first and second glass plates. Therefore, a laminating process of the liquid crystal cell may be omitted, and thus, the possibility of damage and deformation due to high heat treatment may be reduced, and an effect of maintaining humidity via a spacer may occur.

The effects of the disclosure are not limited to the effects described above, and effects not mentioned may be clearly understood by those skilled in the art from the description and accompanying drawings.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A liquid crystal panel comprising:
a first glass plate and a second glass plate facing each other;
a liquid crystal cell arranged between the first glass plate and the second glass plate;
a first spacer arranged between the first glass plate and the liquid crystal cell, and configured to space the liquid crystal cell from the first glass plate; and
a second spacer arranged between the second glass plate and the liquid crystal cell, and configured to space the liquid crystal cell from the second glass plate, wherein the liquid crystal cell includes a first glass sheet comprising a first wider surface contacting the first spacer and a second wider surface opposite the first wider surface, a second glass sheet spaced apart from the first glass sheet, the second glass sheet comprising a first wider surface and a second wider surface opposite the first wider surface of the second glass sheet, the second wider surface of the second glass sheet contacting the second spacer, and a liquid crystal layer arranged between the first glass sheet and the second glass sheet, the liquid crystal layer comprising a first wider surface contacting the second wider surface of the first glass sheet, wherein one or more of the first glass sheet and the second glass sheet have a thickness of less than or equal to about 1 mm.

2. The liquid crystal panel of claim 1, further comprising an external driving device located outside the liquid crystal cell, wherein the liquid crystal cell is configured to be supplied with electrical energy from the external driving device.

3. The liquid crystal panel of claim 2, wherein the liquid crystal cell is configured to switch among a transparent mode, a haze mode, and a black mode, according to an amount of electrical energy supplied from the external driving device.

4. The liquid crystal panel of claim 1, wherein the liquid crystal layer is controllable to adjust a visible light transmittance of the liquid crystal panel.

5. The liquid crystal panel of claim 1, wherein each of a thickness of the first glass plate and a thickness of the second glass plate is greater than a greater of a thickness of the first glass sheet and a thickness of the second glass sheet.

6. The liquid crystal panel of claim 1, wherein the liquid crystal cell includes a solar cell substrate.

7. The liquid crystal panel of claim 1, wherein each of the first glass plate and the second glass plate includes soda lime glass.

8. The liquid crystal panel of claim 1, further comprising low-e coating layers respectively disposed on one surface of the first glass plate facing the second glass plate and one surface of the second glass plate facing the first glass plate.

9. The liquid crystal panel of claim 1, wherein each of the first glass plate and the second glass plate has a thickness greater than or equal to 3 mm and less than or equal to 10 mm.

10. A liquid crystal panel comprising:
a liquid crystal cell including a first glass sheet comprising a first wider surface and a second wider surface opposite the first wider surface, a second glass sheet spaced apart from the first glass sheet in a first direction, the second glass sheet comprising a first wider surface and a second wider surface opposite the first wider surface of the second glass sheet, and a first liquid crystal layer and a second liquid crystal layer stacked against one another in the first direction between the first glass sheet and the second glass sheet, the first liquid crystal layer comprising a first wider surface contacting the second wider surface of the first glass sheet, the second liquid crystal layer comprising a second wider surface contacting the first wider surface of the second glass sheet, and one or more of the first glass sheet and the second glass sheet having a thickness of less than or equal to 1 mm;
a first glass plate and a second glass plate arranged to be spaced apart from each other in the first direction with the liquid crystal cell therebetween;
a first spacer contacting the first wider surface of the first glass sheet and arranged between the first glass plate and the liquid crystal cell, and configured to space the liquid crystal cell from the first glass plate; and
a second spacer contacting the second wider surface of the second glass sheet and arranged between the second glass plate and the liquid crystal cell, and configured to space the liquid crystal cell from the second glass plate.

11. The liquid crystal panel of claim 10, wherein a surface of the first spacer parallel to the first direction is coplanar with a surface of the first glass plate parallel to the first direction.

12. The liquid crystal panel of claim 10, wherein a surface of the first spacer parallel to the first direction is located at a different vertical level from a surface of the first glass plate parallel to the first direction.

13. The liquid crystal panel of claim 10, wherein each of a circumference of the first spacer and a circumference of the second spacer is offset from a circumference of the first glass plate or a circumference of the second glass plate by a first distance.

14. The liquid crystal panel of claim 10, wherein a circumference of the liquid crystal cell is offset from a circumference of the first glass plate or a circumference of the second glass plate by a second distance.

15. The liquid crystal panel of claim 10, wherein the second liquid crystal layer is controllable to adjust a visible light transmittance of the liquid crystal panel.

16. The liquid crystal panel of claim 10, wherein the first liquid crystal layer includes a solar cell substrate.

17. A liquid crystal panel comprising:
a first glass plate and a second glass plate facing each other;
a liquid crystal cell arranged between the first glass plate and the second glass plate;
a first spacer arranged between the first glass plate and the liquid crystal cell, and configured to space the liquid crystal cell from the first glass plate;
a second spacer arranged between the second glass plate and the liquid crystal cell, and configured to space the liquid crystal cell from the second glass plate; and
low-e coating layers respectively disposed on one surface of the first glass plate facing the second glass plate and one surface of the second glass plate facing the first glass plate, wherein the liquid crystal cell includes a first glass sheet comprising a first wider surface contacting the first spacer and a second wider surface opposite the first wider surface, a second glass sheet spaced apart from the first glass sheet, the second glass sheet comprising a first wider surface and a second wider surface opposite the first wider surface of the second glass sheet, the second wider surface of the second glass sheet contacting the second spacer, and a first liquid crystal layer arranged between the first glass sheet and the second glass sheet, and a first wider surface of the first liquid crystal layer is in contact with the second wider surface of the first glass sheet, wherein one or more of the first glass sheet and the second glass sheet have a thickness of less than or equal to about 1 mm.

18. The liquid crystal panel of claim 17, further comprising a second liquid crystal layer stacked against the first liquid crystal layer between the first glass plate and the second glass plate, wherein the first liquid crystal layer is controllable to adjust a visible light transmittance of the liquid crystal panel, and the second liquid crystal layer includes a solar cell substrate.

19. The liquid crystal panel of claim 1, wherein the first glass sheet and the second glass sheet include aluminosilicate glass.

20. The liquid crystal panel of claim 1, wherein the first glass sheet and the second glass sheet each comprise a fusion-molded glass sheet comprising a fusion line due to the fusion of separate glass layers into a single glass sheet during molding.

21. The liquid crystal panel of claim 1, wherein the liquid crystal layer comprises a second wider surface contacting the first wider surface of the second glass sheet.

22. The liquid crystal panel of claim 1, wherein the first spacer contacts one surface of the first glass plate facing the second glass plate and the second spacer contacts one surface of the second glass plate facing the first glass plate.

23. The liquid crystal panel of claim 17, wherein the liquid crystal layer comprises a second wider surface opposite the first wider surface of the liquid crystal layer, wherein the second wider surface of the liquid crystal layer contacts the first wider surface of the second glass sheet.

* * * * *